United States Patent
Tiemann

(10) Patent No.: US 6,676,370 B2
(45) Date of Patent: Jan. 13, 2004

(54) SHAPED PART FOR FORMING A GUIDE RING

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 5 days.

(21) Appl. No.: 10/117,612

(22) Filed: Apr. 4, 2002

(65) Prior Publication Data

US 2002/0154992 A1 Oct. 24, 2002

(30) Foreign Application Priority Data

Apr. 4, 2001 (EP) .......................................... 01108479

(51) Int. Cl.[7] .............................................. F01D 11/08
(52) U.S. Cl. ................... 415/116; 415/173.1; 416/97 R
(58) Field of Search ................................. 415/115, 116, 415/173.2, 127, 138, 136; 416/97 R, 204 R, 204 A

(56) References Cited

U.S. PATENT DOCUMENTS

| 4,573,866 A | | 3/1986 | Sandy, Jr. et al. | |
| 5,048,288 A | * | 9/1991 | Bessette et al. | 60/226.1 |
| 5,127,793 A | | 7/1992 | Walker et al. | |
| 5,391,052 A | | 2/1995 | Correia et al. | |
| 5,538,393 A | | 7/1996 | Thompson et al. | |
| 5,593,278 A | * | 1/1997 | Jourdain et al. | 415/173.2 |
| 5,609,469 A | | 3/1997 | Worley et al. | |
| 5,964,575 A | | 10/1999 | Marey | |
| 5,993,150 A | | 11/1999 | Liotta et al. | |
| 6,047,552 A | | 4/2000 | Gross et al. | |
| 6,089,821 A | * | 7/2000 | Maguire et al. | 415/115 |

FOREIGN PATENT DOCUMENTS

| EP | 0 690 205 | 1/1996 |
| GB | 849255 | 9/1960 |
| WO | WO99/09354 | 2/1999 |

* cited by examiner

Primary Examiner—Edward K. Look
Assistant Examiner—J. M. McAleenan

(57) ABSTRACT

A shaped part (30) for forming a guide ring (21) for a gas turbine (1) is, on the one hand, to be produced with particularly little outlay and, on the other hand, is to be designed so that it can be cooled particularly effectively with steam as the coolant. For this purpose, according to the invention the shaped part (30) comprises a base plate (34) which, together with an associated metal guide plate (38, 44, 52), forms a flow passage (36) for a coolant which, in cross section, extends substantially over its entire width, with respect to the axial direction (x) of the guide ring (20, 21).

20 Claims, 5 Drawing Sheets

SHAPED PART FOR FORMING A GUIDE RING

CROSS-REFERENCE TO RELATED APPLICATIONS

This application is based on and hereby claims priority to European Patent Application No. 01108479.5, filed Apr. 4, 2001, the contents of which are hereby incorporated by reference.

FIELD OF THE INVENTION

The invention relates to a shaped part for forming a guide ring for a gas turbine. It also relates to a gas turbine having a guide ring which is assembled from a number of shaped parts of this type.

BACKGROUND OF THE INVENTION

Gas turbines are used in numerous sectors to drive generators or working machines. The energy content of a fuel is used to generate a rotary movement of a turbine shaft. For this purpose, the fuel is burnt in a combustion chamber, with air which has been compressed which has been compressed by air compressor being supplied. The working medium which is generated in the combustion chamber through the combustion of the fuel and is under a high pressure and at a high temperature is, in the process, guided via a turbine unit connected downstream of the combustion chamber, where it is expanded in a work-performing manner.

To generate the rotary movement of the turbine shaft, a number of rotor blades, which are usually combined in groups or rows of blades and drive the turbine shaft via a pulsed transfer from the flow medium, are arranged on the turbine shaft. Moreover, to guide the flow medium in the turbine unit, there are usually rows of guide vanes connected to the turbine housing between adjacent rows of rotor blades. To suitably guide the working medium, the guide vanes have a vane part, on the end side of which a blade root, which is also known as a platform, is formed integrally in order to secure the turbine vane to the respective supporting body. This platform, which is usually secured or hooked to an inner wall of the turbine unit, also, by means of its surface facing the interior of the turbine unit, delimits the flow region for the working medium flowing through the turbine unit. In order to form a flow passage with a relatively smooth internal surface for the working medium, the turbine unit usually additionally includes what are known as guide rings arranged between the platform of adjacent rows of guide vanes, as seen in the direction of flow of the working medium, which guide rings bridge the gap which is left by the platforms of adjacent guide vanes, as seen in the direction of flow of the working medium.

When designing gas turbines, in addition to the output which can be achieved, a particularly high efficiency is usually a design aim. For thermodynamic reasons, the efficiency can in principle be increased by increasing the outlet temperature at which the working medium flows out of the combustion chamber and into the turbine unit. Therefore, temperatures of approximately 1200° C. to 1300° C. are desired and indeed achieved for gas turbines of this type.

At such high temperatures of the working medium, however, the components and parts which are exposed to this medium are subject to high thermal loads. In order, nevertheless, to combine high levels of reliability with a relatively long service life of the relevant component, it is customary to cool the components in question. Accordingly, the guide rings arranged at the hot-gas passage are usually designed so that they can be cooled. In operation, they are heated relatively strongly, and consequently relatively high thermal expansion needs to be taken into account.

Cooling air is generally used as coolant in a gas turbine of this type, in the manner of an open cooling arrangement. The cooling air provided as coolant is in this case fed to the corresponding turbine blade or vane or component via an integrated coolant passage. Starting from this passage, the cooling air flows through the corresponding part in passages which branch off and are usually left open at the outlet end. After it has flowed through the respective component, therefore, the cooling air emerges from the component and, in so doing, is mixed with the working medium carried in the turbine unit.

However, the cooling action which can be achieved when cooling air is used as coolant is limited. Accordingly, for a gas turbine which is cooled in this way, the efficiency achieved is limited even when thermal barrier coatings are used for the thermally loaded components, especially since an increased demand for cooling would lead to losses in the compressor mass flow rate available for combustion, and these losses for their part can only be accepted to a limited extent. It may therefore be desirable to turn away from a cooling arrangement which is based on cooling air and to provide a cooling arrangement which uses cooling steam as cooling medium. However, in this case in particular the provision of a guide ring which can be cooled reliably and sufficiently, despite inherently being a relatively simple component, have proven particularly complex.

SUMMARY OF THE INVENTION

The invention is therefore based on the object of describing a shaped part for forming a guide ring for a gas turbine which can be produced with particularly little outlay and, moreover, can be cooled particularly effectively with steam as coolant. Moreover, it is intended to provide a gas turbine having a guide ring which can be cooled reliably with steam as cooling medium and can be produced particularly easily.

With regard to the shaped part, this object is achieved, according to the invention, by a base plate which, together with an associated metal guide plate, forms a flow passage for a coolant which, in cross section, extends over substantially its entire width, with respect to the axial direction of the guide ring.

The invention is based on the consideration that, to achieve a particularly simple and therefore also inexpensive design of the guide ring, the flow path for the cooling medium flowing through it should be kept particularly simple. To ensure particularly reliable cooling, there is provision for the piece of material which is exposed to the hot-gas side, namely the base plate, to be acted on over substantially its entire area. In order, in the process, to ensure that the flow path for the coolant is separated from the interior of the gas turbine, which is necessary when using steam as coolant, the base plate is assigned a metal guide plate in order to form a substantially closed, large-area flow passage.

Reliable cooling with relatively little outlay on cooling medium is made possible as a result of the metal plates and, in particular, the metal guide plate preferably being designed as a relatively thin metal plate.

When steam is being used as cooling medium, the flow path of the cooling medium should be particularly well separated from the flow space of the working medium in the turbine. In order, under this condition, to additionally allow steam, as cooling medium, to act on the base plate over substantially its entire area, with particularly simple means, it is advantageous for a second metal guide plate, which together with the first metal guide plate forms a flow-inlet space for the coolant, to be arranged on that side of the metal guide plate which is remote from the base plate. In this case, the flow-inlet space is expediently in communication, in an inflow region, with the flow passage formed by the first metal guide plate and the base plate. In this case, it is advantageous for a steam feedline to open out into the flow-inlet space.

In a further advantageous configuration, the shaped part is designed in a similar way in order to discharge the steam provided as coolant. In this case, a third metal guide plate is assigned to the second metal guide plate on its side which is remote from the first metal guide plate. This third metal guide plate, together with the second metal guide plate, forms a flow-outlet space for the coolant. The metal guide plates are expediently designed in such a manner than the flow-outlet space for the coolant is in communication, in a discharge region, with the flow passage formed by the base plate and the first metal guide plate. In this case, a steam discharge line advantageously opens out into the flow-outlet space.

Therefore, in addition to a base plate, a shaped part which is developed in this manner has at least three metal guide plates arranged one above the other in the manner of a stack. The intermediate spaces which are formed by in each case two metal guide plates or by one metal guide plate and the base plate are used, with specific objects, as flow space for the coolant, with a flow-inlet space, a flow passage and a flow-outlet space being provided. This results, in a particularly simple manner, in the creation of a shaped part which is complete in terms of its functionality and is particularly flexible. The use of metal guide plates makes it particularly simple to create the various flow regions for the coolant.

The outlay for cooling the shaped part is kept particularly low, since the metal guide plates used and/or the base plate used are kept particularly thin. In order, when using relatively thin metal plates, to ensure a particularly high mechanical strength and load-bearing capacity of the shaped part, the base plate, in a particularly advantageous configuration, has, on the top side, a number of reinforcing ribs which run substantially in the axial direction of the guide ring. They form flow passages for the coolant which are connected substantially in parallel.

The use of steam as coolant for the gas turbine requires a relatively high leak tightness of the corresponding steam feeds and discharges, so that leakage of the cooling steam into the flow region of the gas turbine is reliably avoided. In particular, the introduction of steam into and the discharge of steam from the guide ring should be particularly reliably sealed. For this purpose, it is possible to provide appropriate threaded pipe connections at the steam inlet and outlet of the shaped part. To create the space required for this purpose and, in particular, for fitting the corresponding steam lines, each shaped part which is provided for forming the guide ring is expediently designed to hook centrally into the gas turbine, as seen in the radial and axial direction of the guide ring. This is because a centrally configured hook connection of this type in particular makes it possible to maintain the feeds and discharges of coolant which are present in an open-cooled gas turbine in substantially unchanged form, while, when using steam as coolant, screw connections which have been modified only in the region of contact with the guide ring are used. In other words: with a design of this type, the space required to produce the coolant-side connections is provided by the central positioning of the hooked connection, without it being necessary to change the spatial arrangement or guidance of the coolant passages which are provided in an open-cooled gas turbine. Therefore, the design of an open-cooled gas turbine can be transferred to a closed-cooled gas turbine (with steam as coolant) using particularly little outlay in the style of "Delta Engineering".

A centrally arranged hooked connection of this type can be produced particularly easily, since a carrier hook is advantageously arranged on in each case a plurality of adjacent reinforcing ribs of the base plate, so as to form through-flow openings which are delimited by the base plate, in each case two adjacent reinforcing ribs and the respective carrier hook. The carrier hooks are therefore fitted individually onto in each case a plurality of, for example two to four, reinforcing ribs, with in each case a number of passages or through-flow openings for the coolant being formed below each carrier hook. Therefore, the coolant flows beneath the carrier hooks, so that particularly effective cooling becomes possible and, moreover, thermal stresses are kept at particularly low levels. In a further advantageous configuration, the or each carrier hook is arranged centered, as seen in the axial direction of the guide ring.

With regard to a gas turbine having a number of rotor blades, which have in each case been combined to form rows of rotor blades and are arranged on a turbine shaft, and having a number of guide vanes, which are in each case combined to form rows of guide vanes and are connected to a turbine housing, said object is achieved by the fact that a guide ring, which is assembled from a number of said shaped parts, is arranged in the inner region of the turbine housing.

In this case, the guide ring is advantageously arranged between the first row of guide vanes and the second row of guide vanes, as seen in the direction of flow of the working medium.

The advantages which are achieved by the invention consist, in particularly, in the fact that the metal guide plate assigned to the base plate allows the formation of a flow passage which, in cross section, extends substantially over the entire base plate, so that it is ensured that the base plate is exposed to coolant over substantially its entire area. The first metal guide plate and, in particular, also the second and third metal guide plates which are additionally provided lead, in a particularly simple manner and with particularly low production costs, in favorable guidance of the coolant in the region of the guide ring, the first metal guide plate being used to guide the coolant over the base plate which is exposed to hot gases while ensuring a desired cross section. The middle or second metal guide plate, by contrast, is used to provide guidance between this metal plate and the first metal guide plate, to an inflow region, from which the coolant passes into the flow passage formed by the base plate and the first metal guide plate. By contrast, the third metal guide plate, together with the second metal guide plate, forms a flow-outlet region for the coolant. A design of this type, which forms a set of metal guide plates, can be produced particularly easily, while also satisfying relatively high demands in terms of the leak-tightness.

BRIEF DESCRIPTION OF THE DRAWINGS

An exemplary embodiment of the invention is explained in more detail with reference to a drawing, in which.

Identical parts are provided with identical reference symbols throughout all the figures.

DETAILED DESCRIPTION

Figure 1:
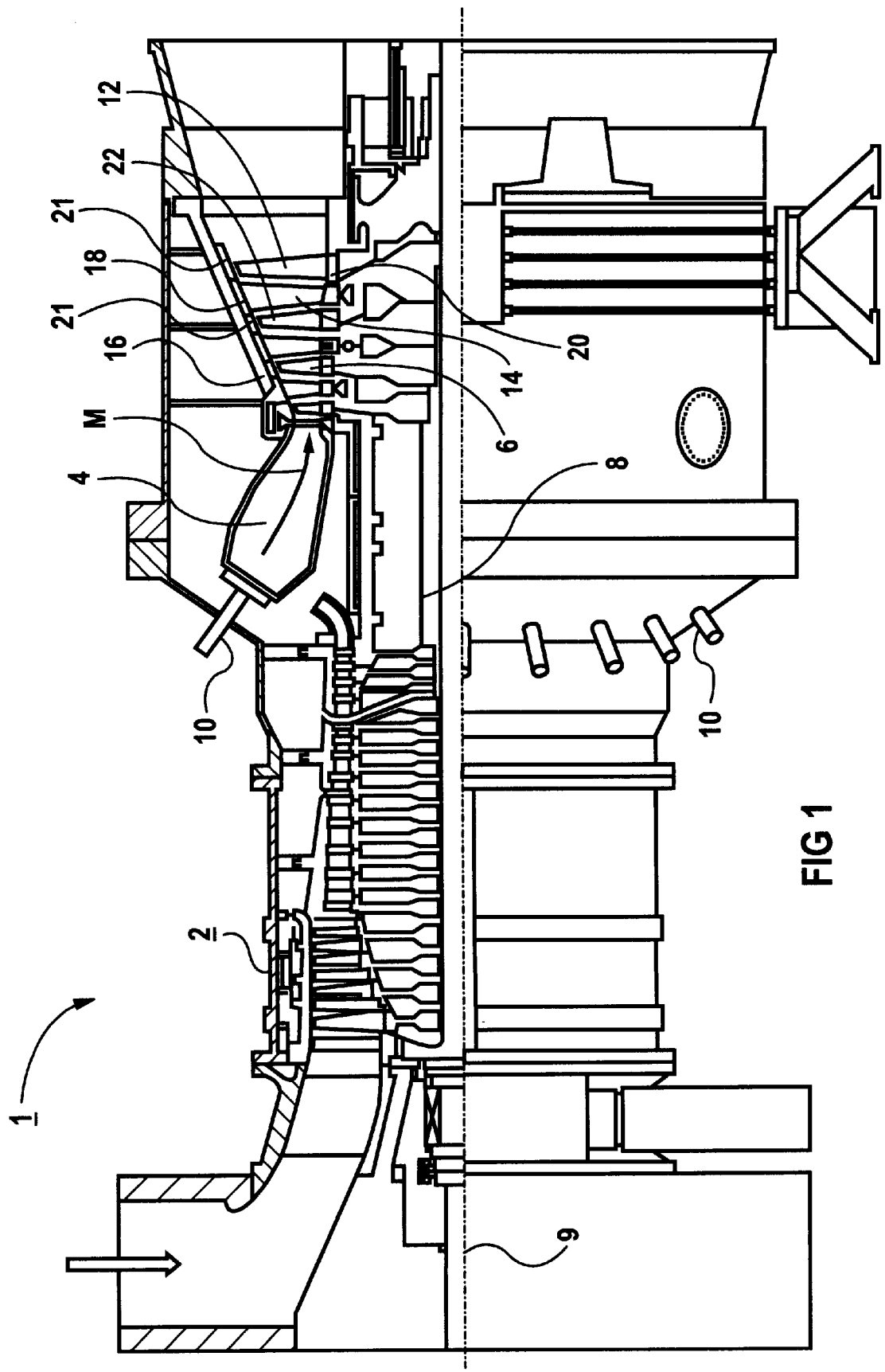
FIG. 1 shows a half-section through a gas turbine.

The gas turbine 1 shown in FIG. 1 has a compressor 2 for combustion air, a combustion chamber 4 and a turbine 6 for driving the compressor 2 and a working machine or generator (not shown). For this purpose, the turbine 6 and the compressor 2 are arranged on a common turbine shaft 8, also known as the turbine rotor, to which the generator or the working machine is also connected and which is mounted so that it can rotate about its center axis 9.

The combustion chamber 4 is fitted with a number of burners 10 for burning a liquid or gaseous fuel. Furthermore, it is provided, on its inner wall, with heat shield elements (not shown in more detail).

The turbine 6 has a number of rotor blades 12 which can rotate and are connected to the turbine shaft 8. The rotor blades 12 are arranged in the form of a ring on the turbine shaft 8 and therefore form a number of rows of rotor blades. Furthermore, the turbine 6 comprises a number of stationary guide vanes 14, which are likewise secured in the form of a ring to the inner housing 16 of the turbine 6, so as to form rows of guide vanes. The rotor blades 12 are used to drive the turbine shaft 8 by pulsed transfer from the working medium M flowing through the turbine 6. By contrast, the guide vanes 14 are used to guide the flow of the working medium M between in each case two successive rows or rings of guide vanes, as seen in the direction of flow of the working medium M. A successive pair comprising a ring of guide vanes 14 or a row of guide vanes and a ring of rotor blades 12 or a row of rotor blades is also known as a turbine stage.

Each guide vane 14 has a platform 18, which is also known as a vane root and, to fix the respective guide vane 14 to the inner housing 16 of the turbine 6, is arranged as a wall element. The platform 18 is a part which is exposed to relatively high thermal loads and forms the outer boundary of a hot-gas passage for the working medium M flowing through the turbine 6. Each rotor blades 12 is secured in a similar manner, by means of a platform 20 which is also known as a blade root, to the turbine shaft 8.

In each case one guide ring 21 is arranged on the inner housing 16 of the turbine 6 between the platforms 18 which are spaced apart from one another, of the guide vanes 14 of two adjacent rows of guide vanes. The outer surface of each guide ring 21 is likewise exposed to the hot working medium M flowing through the turbine 6 and is spaced apart, as seen in the radial direction, from the outer end 22 of the opposite rotor blade 12 by a gap. The guide rings 21 arranged between adjacent rows of guide vanes are used in particular as covering elements, which protect the inner wall of the inner housing 16 or other housing fittings from excessive thermal loads caused by the hot working medium M flowing through the turbine 6.

To achieve a relatively high efficiency, the gas turbine 1 is designed for a relatively high outlet temperature of the working medium M emerging from the combustion chamber 4 of approximately 1200° C. to 1300° C. To allow this, at least some of the rotor blades 12 and of the guide vanes 14 are designed so that they can be cooled, steam being provided as the coolant. In addition, the guide rings 21 are also designed such that they can be cooled by steam.

Figure 2:
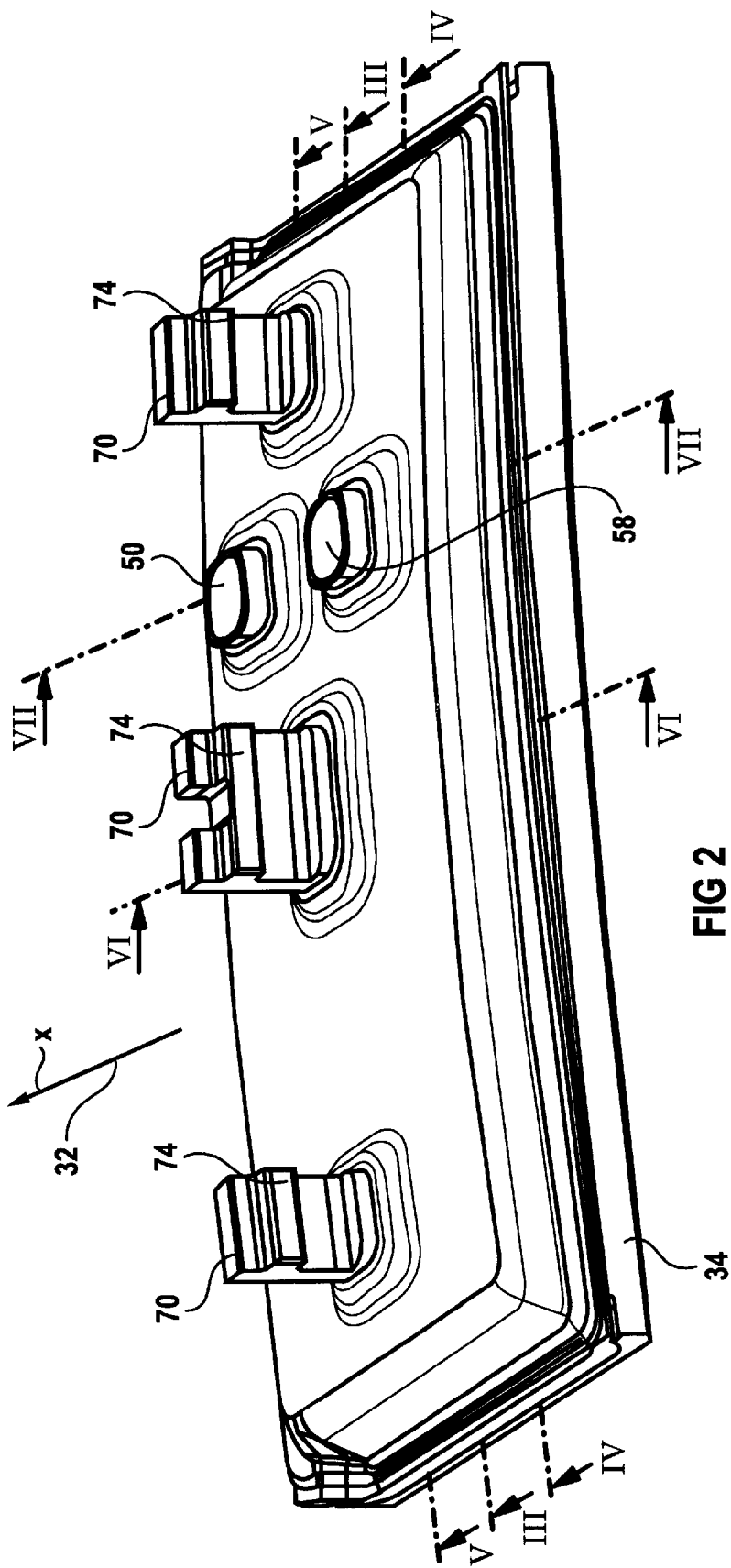
FIG. 2 shows a perspective illustration of a shaped part for forming a guide ring, FIGS. 3, 4, 5 each show a cross section through the shaped part illustrated in FIG. 2, and FIGS. 6, 7 each show a longitudinal section through the shaped part shown in FIG. 2.
Figure 3:
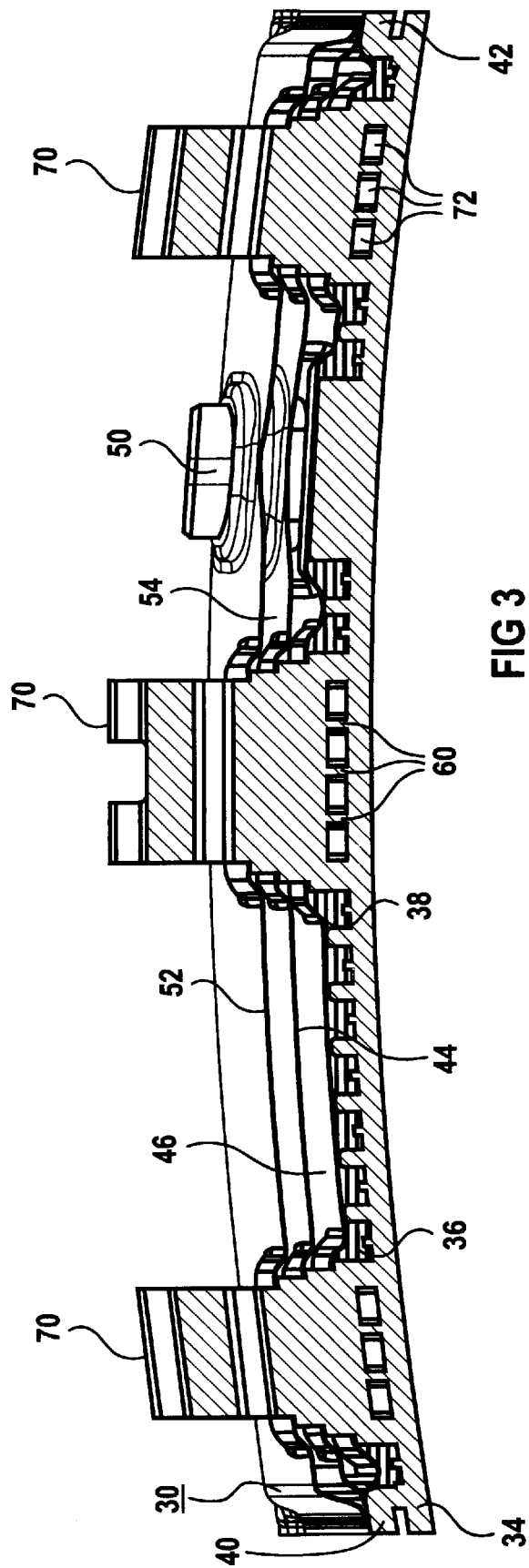
Figure 4:
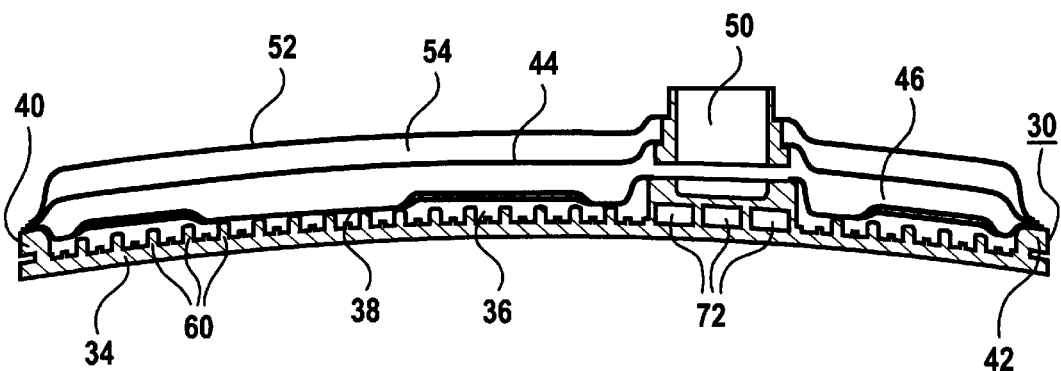
Figure 5:
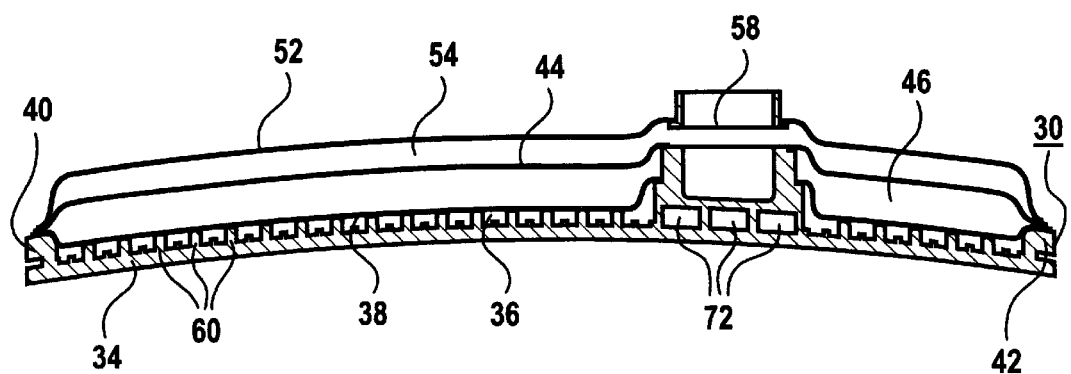

For this purpose, the guide ring 21 is in each case assembled from a number of shaped parts 30. A shaped part 30 which is intended to form the first guide ring 21, as seen in the direction of flow of the working medium M, is illustrated in perspective in FIG. 2. The shaped part 30 is also shown in cross section in FIGS. 3, 4 and 5, on section lines indicated in FIG. 2, and in longitudinal section in FIGS. 6 and 7, on section lines which are likewise indicated in FIG. 2. In this context, the terms "cross-section" and "longitudinal sections" relate to the axial direction x, which substantially corresponds to the direction of flow of the working medium M in the turbine 6 and is indicated by arrow 32 in FIG. 2, of the guide ring 21 formed from a number of the shaped parts 30.

As can be seen in particular from FIGS. 3 to 7, the shaped part 30 comprises a base plate 34, which is bent in the manner of segments of a circle in the circumferential direction of the guide ring 21 which is to be formed and which, when the gas turbine 1 is operating, is directly exposed to the hot-gas stream flowing through the turbine 6. In order, nevertheless, to ensure reliable operation of the gas turbine 1 even at relatively high temperatures of the working medium M, the shaped part 30 is designed for steam as coolant to act on substantially the entire area of the base plate 34. To form a flow passage 36 which is sealed and partitioned off from the outer region of the shaped part 30 and therefore also from the flow space for the working medium M in the turbine 6, the base plate 34 is assigned a metal guide plate 38. The deep-drawn metal guide plate 38, which is formed from a relatively thin metal sheet, extends over substantially the entire width of the base plate 34 and, at the lateral ends of the base plate 34, is welded onto end frames 40, 42 which are formed integrally at those locations. Therefore, the metal guide plate 38, together with the base plate 34, forms a flow passage 36 which extends substantially over the entire width of the base plate 34, so that it is ensured that steam which is carried in the flow passage 36 as coolant acts on substantially the entire area of the base plate 34.

Above the metal guide plate 38, i.e. on that side of the metal guide plate which is remote from the base plate 34, there is a second, likewise deep-drawn metal guide plate 44, which likewise extends substantially over the entire width of the base plate 34 and, together with the metal guide plate 38, forms a flow-inlet space 46 for steam and coolant. The second metal guide plate 44 is likewise welded laterally onto the end frames 40, 42.

Figure 6:
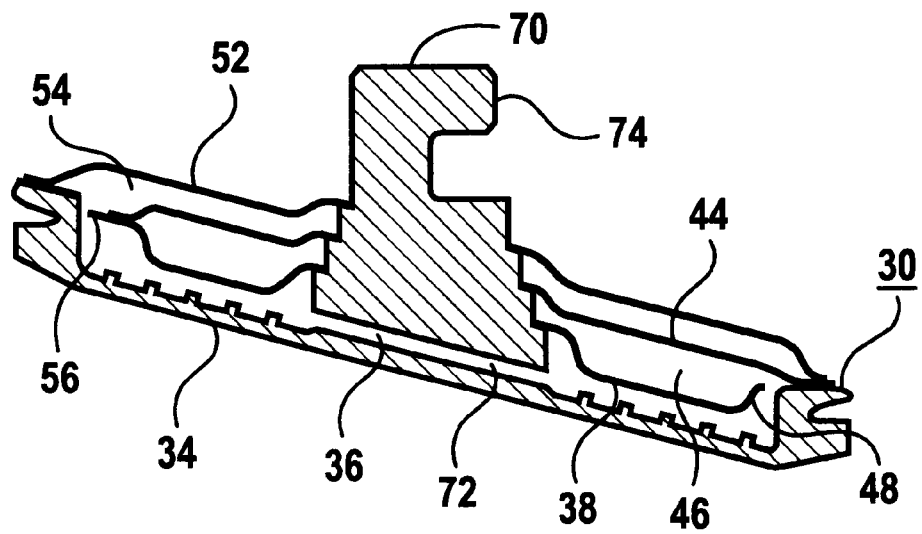
Figure 7:
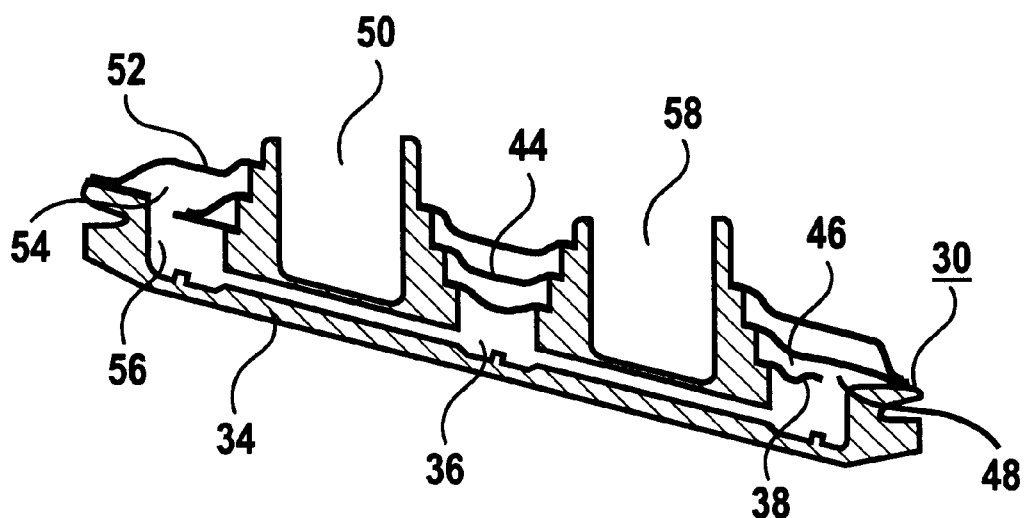

The flow-inlet space 46, which is delimited by the first metal guide plate 38 and by the second metal guide plate 44, is in communication, as can be seen in particular from FIGS. 6 and 7, in an inflow region 48, with the flow passage 36 formed by the first metal guide plate 38 and the base plate 34. The connection between the flow-inlet space 46 and the flow passage 36 may in this case be produced by means of a slot-like opening which extends in the transverse direction of the shaped parts 30 or alternatively by means of a number of bores in the first metal guide plate 38, which are arranged in the corresponding spatial region. As can be seen from FIG. 4, a steam feedline 50 opens into the flow-inlet space 46 and, at its free end, is equipped with suitable means, such as for example a screw thread, for producing a threaded pipe connection to a steam supply line.

A third, likewise deep-drawn metal guide plate 52 is provided for the purpose of discharging the steam provided as coolant from the flow passage 36 in the manner of a closed cooling arrangement. The third metal guide plate 52 is in this case arranged above the second metal guide plate 44, so as to form a flow-outlet space 54, so that the overall result is substantially a stacked design of the metal guide plate 38, 44, 52 on the base plate 34. The third metal guide plate 52 is likewise welded at the end side onto the end frames 40, 42.

The flow-outlet space 54 which is delimited by the second metal guide plate 44 and the third metal guide plate 52 is in communication, in a discharge region 56, with the flow passage 36 for the coolant. To discharge the steam, which is provided as coolant, from the flow-outlet space 54, a steam discharge line 58 opens out into the flow-outlet space 54. In a similar manner to the steam feedline 50, the steam discharge line 58 is also provided at the end sides with means for fitting a steam line, for example a screw thread for fitting a threaded pipe connection.

To provide mechanical stability and to ensure sufficient strength of the shaped part 30 even on the relatively high mechanical and thermal stresses, the base plate 34 has, on its top side which is remote from the flow passage 36, a number of reinforcing rings 60 which extend substantially in the axial direction x of the guide ring 21. The reinforcing ribs 60 may, at their end side, be in mechanical contact with the first metal guide plate 38, without, however, a seal being provided. Therefore, on the one hand, application of coolant to substantially the entire area of the base plate 34 is ensured while, on the other hand, the reinforcing ribs 60 form a number of substantially parallel flow passages for the coolant.

The steam feedline 50 and the steam discharge line 58 are positioned in such a manner on the shaped part 30 that reliable supply and removal of steam is possible even when using coolant passages provided in similar gas turbines with open cooling. To allow adapted positioning of the steam feedline 50 and of the steam discharge line 58 and, moreover, to provide the space required for fitting of the corresponding threaded pipe connections even when the demands imposed on the seal are high, the shaped part 30 is designed for a central hook connection. For this purpose, there is a number of support hooks 70 arranged centrally on the shaped part 30, as seen in the axial direction x of the guide ring 21. Each support hook 70 is fitted in each case onto a few of the reinforcing ribs 60 and extends over a plurality of the reinforcing ribs 60, as seen in the transverse direction of the shaped part 30. As can be seen in particular from FIG. 3, each support hook 70 is fitted onto the respective reinforcing ribs 60 in such a manner that in each case two adjacent reinforcing ribs 60, together with the base plate 34 and the respective support hooks 70, form a number of through-flow openings 72. Therefore, the coolant flows beneath the support hooks 70, in the manner of a tunneled design, so that thermal stresses which occur in the shaped part 30 are kept particularly low even when relatively high thermal loads are applied. Moreover, the support hooks 70 are designed with integrally formed support lugs 74 and can be brought into engagement with corresponding support elements on the inner wall of the inner housing 16 of the turbine 6.

Moreover, in a similar way the steam feedline 50 and the steam discharge line 58 are fitted in each case on a plurality of reinforcing ribs 60, to form through-flow openings 72 for the coolant.

Both the support hooks 70 and the steam feedline 50 and the steam discharge line 58 are of stepped design in terms of their external contour. To provide further support, the first metal guide plate 38 is likewise welded onto the first step of the support hooks 70, which are fitted onto the reinforcing ribs 60 and beneath which the coolant flows, and of the steam feedline 50 and of the steam discharge line 58. In a similar manner, the second metal guide plate 44 and the third metal guide plate 52 are also welded onto the second or third step in the external contour of each support hook 70 and of the steam feedline 50 and of the steam outlet line 58. The stacked structure of the three metal guide plates 38, 44, 52 arranged one above the other therefore provides a particularly high level of mechanical stability.

Therefore, the shaped part 30 forms, in a particularly simple design and with particularly low manufacturing outlay, the following closed flow path for steam as coolant: from the steam feedline 50, the steam which is provided as coolant passes into the flow-inlet space 46 which is formed by the second metal guide plate 44 together with the first metal guide plate 38. In the flow-inlet space 46, the steam is guided to the inflow region 48 by means of the second metal guide plate 44. In the inflow region 48, the steam passes from the flow-inlet space 46 into the actual flow passage 36. The guiding of the coolant flow over that side of the material which is exposed to hot gases, ensuring a relatively large cross section of flow, is then provided by the first metal guide plate 38. From the flow passage 36, the coolant passes into the discharge region 56, and, from there, into the flow-outlet space 54, which is formed by the third metal guide plate 52 together with the second metal guide plate 44. From the flow-outlet space 54, the coolant then passes to the steam discharge line 58, from which it is removed from the gas turbine 1 via a closed system of pipes. Therefore, flow guidance of the coolant in the axial direction x of the guide ring 21 is ensured by relatively simple means using the metal guide plates 38, 44, 52.

The above description contains many specific examples. These examples are provided for the purpose of illustration and should not be construed as limiting the scope of the invention. The scope of the invention should be determined by the appended claims and their legal equivalents.

| \ | List of reference symbols |
|---|---|
| 1 | Gas turbine |
| 2 | Compressor |
| 4 | Combustion chamber |
| 6 | Turbine |
| 8 | Turbine shaft |
| 9 | Center axis |
| 10 | Burner |
| 12 | Rotor blades |
| 14 | Guide vanes |
| 16 | Inner housing |
| 18, 20 | Platform |
| 21 | Guide ring |
| 22 | Outer end |
| 30 | Shaped parts |
| 32 | Arrow |
| 34 | Base plate |
| 36 | Flow passage |
| 38 | First metal guide plate |
| 40, 42 | End frame |
| 44 | Second metal guide plate |
| 46 | Flow-inlet space |
| 48 | Inflow region |
| 50 | Stream feedline |
| 52 | Third metal guide plate |
| 54 | Flow-outlet space |
| 56 | Discharge region |
| 58 | Steam discharge line |
| 60 | Reinforcing ribs |
| 70 | Support hooks |
| 72 | Through-flow openings |

-continued

| | List of reference symbols | |
|---|---|---|
| 74 | Support lugs | |
| M | Working medium | |
| x | Axial direction | |

What is claimed is:

1. A guide ring for use in a gas turbine, comprising:
   a base plate having a radially outward side and a radially inward side, said radially inward side being exposed to a working medium of said gas turbine;
   a first and second metal guide plate formed on said radially outward side of said base plate;
   an inlet coolant connection formed on said radially outward side of said base plate, said inlet coolant connection penetrating through said first and second metal guide plates;
   a flow-inlet space formed by said first and second metal guide plates and in communication with said inlet coolant connection; and
   a flow passage formed by said first metal guide plate and said base plate, said flow passage being in communication with said flow inlet space via an inflow region, whereby in cross section the flow passage extends over substantially the entire width of the guide ring with respect to the axial direction of the guide ring.

2. The guide ring of claim 1, wherein said inlet coolant connection comprises a steam feedline.

3. The guide ring of claim 1, further comprising an outlet coolant connection that penetrates through said first and second metal guide plates and that is in communication with a flow-outlet space formed by said first and second metal guide plates.

4. The guide ring of claim 3, wherein said flow-outlet space is in communication with said flow passage via a discharge region.

5. The guide ring of claim 3, wherein said outlet coolant connection comprises a steam discharge line.

6. The guide ring of claim 1, wherein said base plate has a plurality of reinforcing ribs that run substantially in the axial direction of said guide ring.

7. The guide ring of claim 6, further comprising a support hook formed on said base plate that penetrates through said metal guide plates, said support hook having a plurality of through-flow openings for passing said coolant.

8. The guide ring of claim 7, wherein said support hook is centered on said guide ring in the axial direction of said guide ring.

9. The guide ring of claim 7, wherein through-flow openings are formed by a space between adjacent reinforcing ribs.

10. A gas turbine, comprising:
    a plurality of rotor blades arranged on a turbine shaft;
    a plurality of guide vanes connected to a turbine housing; and
    a guide ring comprising
       a base plate having a radially outward side and a radially inward side, said radially inward side being exposed to a working medium of said gas turbine,
       a first and second metal guide plate on said radially outward side of said base plate,
       an inlet coolant connection formed on said radially outward side of said base plate, said inlet coolant connection penetrating through said first and second metal guide plates,
       a flow-julet space formed between said first and second metal guide plates, in communication with said inlet coolant connection, and
       a flow passage formed between said first metal guide plate and said base plate, said flow passage being in communication with said flow inlet space via an inflow region, whereby in cross section the flow passage extends over substantially the entire width of the guide ring, with respect to the axial direction of the guide ring.

11. The gas turbine of claim 10, wherein said guide ring is arranged between a first row of guide vanes and a second row of guide vanes.

12. The gas turbine of claim 10, wherein said inlet coolant connection comprises a steam feedline.

13. The gas turbine of claim 10, further comprising an outlet coolant connection that penetrates through said first and second metal guide plates and that is in communication with a flow-outlet space formed by said first and second metal guide plates.

14. The gas turbine of claim 13, wherein said flow-outlet space is in communication with said flow passage via a discharge region.

15. The gas turbine of claim 13, wherein said outlet coolant connection comprises a steam discharge line.

16. The gas turbine of claim 10, wherein said base plate has a plurality of reinforcing ribs that run substantially in the axial direction of said guide ring.

17. The gas turbine of claim 16, further comprising a support hook formed on said base plate that penetrates through said metal guide plates, said support book having a plurality of through-flow openings for passing said coolant.

18. The gas turbine of claim 17, wherein said support book is centered on said guide ring in the axial direction of said guide ring.

19. The gas turbine of claim 17, wherein through-flow openings are formed by a space between adjacent reinforcing ribs.

20. A shaped part for forming a guide ring in a gas turbine, comprising:
    a base plate having a radially outward side and a radially inward side, said radially inward side being exposed to a working medium of said gas turbine;
    a first and second metal guide plate formed on said radially outward side of said base plate;
    an inlet coolant connection formed on said radially outward side of said base plate, said inlet coolant connection penetrating through said first and second metal guide plates;
    a flow-inlet space formed by said first and second metal guide plates and in communication with said inlet coolant connection; and
    a flow passage formed by said first metal guide plate and said base plate, said flow passage being in communication with said flow inlet space via an inflow region, whereby in cross section the flow passage extends over substantially the entire width of the guide ring, wit respect to the axial direction of the guide ring.

* * * * *